United States Patent [19]
White et al.

[11] Patent Number: 6,014,379
[45] Date of Patent: Jan. 11, 2000

[54] TELECOMMUNICATIONS CUSTOM CALLING SERVICES

[75] Inventors: Patrick E. White, Vienna; Robert D. Farris, Sterling, both of Va.

[73] Assignee: Bell Atlantic Network Services, Inc., Arlington, Va.

[21] Appl. No.: 08/752,424

[22] Filed: Nov. 9, 1996

Related U.S. Application Data

[63] Continuation-in-part of application No. 08/729,215, Oct. 9, 1996, which is a continuation-in-part of application No. 08/670,908, Jun. 26, 1996.

[51] Int. Cl.⁷ .......................... H04L 12/66; H04L 12/28; H04J 1/00; H04M 1/64
[52] U.S. Cl. .......................... 370/389; 370/352; 370/401; 370/427; 370/485; 379/88.17; 379/90.01; 379/100.15
[58] Field of Search .................................. 370/352, 353, 370/380, 389, 392, 396, 401, 404, 427, 435, 450, 465, 485; 379/90.01, 93.01, 93.05, 93.09, 100.15, 100.16, 88.17

[56] References Cited

U.S. PATENT DOCUMENTS

| | | | |
|---|---|---|---|
| 4,191,860 | 3/1980 | Weber | 379/115 |
| 4,313,035 | 1/1982 | Jordan et al. | 379/207 |
| 4,555,594 | 11/1985 | Friedes et al. | 179/18 B |
| 4,565,903 | 1/1986 | Riley | 179/18 B |
| 4,577,066 | 3/1986 | Bimonte et al. | 179/18 B |
| 4,652,700 | 3/1987 | Matthews et al. | 379/89 |
| 4,872,160 | 10/1989 | Hemmady et al. | 370/60 |
| 4,958,341 | 9/1990 | Hemmady et al. | 370/60.1 |
| 5,008,926 | 4/1991 | Misholi | 379/94 |
| 5,012,511 | 4/1991 | Hanle et al. | 379/211 |
| 5,029,199 | 7/1991 | Jones et al. | 379/89 |
| 5,193,110 | 3/1993 | Jones et al. | 379/94 |
| 5,206,901 | 4/1993 | Harlow et al. | 379/211 |
| 5,243,645 | 9/1993 | Bissell et al. | 379/211 |
| 5,247,571 | 9/1993 | Kay et al. | 379/207 |
| 5,341,374 | 8/1994 | Lewen et al. | 370/85.4 |
| 5,375,068 | 12/1994 | Palmer et al. | 364/514 |
| 5,377,186 | 12/1994 | Wegner et al. | 370/62 |
| 5,384,831 | 1/1995 | Creswell et al. | 379/67 |
| 5,384,840 | 1/1995 | Blatchford et al. | 379/229 |
| 5,410,754 | 4/1995 | Klotzbach et al. | 370/85.13 |
| 5,425,090 | 6/1995 | Orriss | 379/201 |
| 5,425,091 | 6/1995 | Josephs | 379/201 |
| 5,434,913 | 7/1995 | Tung et al. | 379/202 |
| 5,469,500 | 11/1995 | Satter et al. | 379/201 |
| 5,481,603 | 1/1996 | Gutierrez et al. | 379/221 |
| 5,490,247 | 2/1996 | Tung et al. | 395/162 |
| 5,493,568 | 2/1996 | Sampat et al. | 370/60 |
| 5,506,887 | 4/1996 | Emery et al. | 379/58 |
| 5,572,583 | 11/1996 | Wheeler, Jr. et al. | 379/207 |
| 5,583,920 | 12/1996 | Wheeler, Jr. | 379/88 |
| 5,583,926 | 12/1996 | Venier et al. | 379/207 |
| 5,583,929 | 12/1996 | Ardon | 379/230 |
| 5,590,133 | 12/1996 | Billström et al. | 370/349 |
| 5,598,464 | 1/1997 | Hess et al. | 379/213 |
| 5,604,737 | 2/1997 | Iwami et al. | 370/352 |
| 5,608,786 | 3/1997 | Gordon | 379/100 |
| 5,610,910 | 3/1997 | Focsaneanu et al. | 370/351 |
| 5,610,977 | 3/1997 | Williams et al. | 379/207 |
| 5,625,681 | 4/1997 | Butler, II | 379/207 |
| 5,661,790 | 8/1997 | Hsu | 379/209 |
| 5,706,286 | 1/1998 | Reiman et al. | 370/401 |
| 5,712,903 | 1/1998 | Bartholomew et al. | 379/89 |
| 5,724,355 | 3/1998 | Bruno et al. | 370/401 |
| 5,726,984 | 3/1998 | Kubler et al. | 370/349 |
| 5,737,395 | 4/1998 | Irribarren | 379/88 |
| 5,742,670 | 4/1998 | Bennett | 379/142 |
| 5,742,905 | 4/1998 | Pepe et al. | 455/461 |
| 5,751,707 | 5/1998 | Voit et al. | 370/384 |
| 5,793,762 | 8/1998 | Penners et al. | 370/389 |

OTHER PUBLICATIONS

Kuehn, Richard A. (Jul., 1994) "The Voice of Technology", [Online text only] *Credit World*, vol. 82, No. 6, pp. 20–23.

Margulies, Edwin (Aug., 1996) *Understanding the Voice–Enabled Internet*, Flatiron Publishing, Inc., pp. 4–42 and 12–1 to 12–3.

Mills, M. (Mar. 8, 1996) "Freebie Heebie–Jeebies: New Long–Distance Calling Via the Internet Scares Small Phone Firms", *The Washington Post*, sec. F, pp. 1–2.

Hughes, D.T. (Feb. 21, 1996) "What Hath (Net) God Wrought?", *The Journal* [Fairfax, Virginia], sec. B, pp. 1–2.

Hughes, D.T. (May 28, 1996) "WebPhone Heading for Serious Telephony", *The Journal*, [Fairfax, Virginia], sec. A, p. 8.

Mills, M. (Jan. 23, 1996) "It's the Net's Best Thing to Being There: With Right Software, Computer Becomes Toll–Free Telephone", *The Washington Post*, sec. C, pp. 1,5.

Hughes, D.T. (Jan. 2, 1996) "Internet Phone Wars Heating Up: Companies Improve and Encourage Users to Test Products", *The Journal*, [Fairfax, Virginia], sec. A, p. 6.

Yang, C. (Feb. 12, 1996), INETPhone: Telephone Services and Servers on Internet. http://ds.internic.net/rfc/rfc/rfc1789.txt.

*Primary Examiner*—Krista Zele
*Assistant Examiner*—Allan Hoosain
*Attorney, Agent, or Firm*—McDermott, Will & Emery

[57] ABSTRACT

A telecommunications system wherein the dialing of a directory number which has been forwarded triggers an intelligent network signal which is directed to the Internet. The signal is transmitted through the Internet to a database in the Internet. The database returns call set up directions which are used by the originating switching system to establish a voice link from the calling station to the station having the forwarded number. The intelligent network signal may be transmitted from the terminating switching system to a signal transfer point (STP) and to the Internet. Within the Internet the signal is directed to an Internet database where a forwarding number for the forwarded number is obtained. This is transmitted back to the signal switching point, which then uses the forwarding number to complete the connection. In another embodiment, where a number has been forwarded to a station that is connected only to the Internet, the Internet database may provide a domain name address. This address is then used to establish a link through the Internet between the calling and called station. In this instance the Internet handles both the signaling and the voice connections.

36 Claims, 9 Drawing Sheets

TELECOMMUNICATIONS CUSTOM CALLING SERVICES

RELATED APPLICATIONS

This application is a continuation-in-part of application Ser. No. 08/729,215, filed Oct. 9, 1996, (attorney reference 680-184A), titled Telecommunication Number Portability, which is a continuation-in-part of application Ser. No. 08/670,908, filed Jun. 26, 1996 (attorney reference 680-184), titled Internet Telephone Service, which applications are incorporated by reference herein in their entirety.

TECHNICAL FIELD

This invention pertains to telecommunications networks in general and particularly to the provision of more widely available call custom calling services, such as, for example, call forwarding applications in public switched telephone networks.

ACRONYMS

The written description uses a large number of acronyms to refer to various services, messages and several of these acronyms is not strictly standardized in the art. For purposes of this discussion, acronyms therefore will be defined as follows:

Advanced Intelligent Network (AIN)
Automated Number Identification (ANI)
Automated Teller Machine (ATM)
Called Party Number (CPN)
Carrier Portability Code (CPC)
Central Office (CO)
Common Channel Interoffice Signaling (CCIS)
Common Channel Signaling (CCS)
Customer Number Address (CNA)
Destination Point Code (DPC)
Domain Name Service (DNS)
Dual Tone Multifrequency (DTMF)
Dynamic Host Configuration Protocol (DHCP)
Generic Address Parameter (GAP)
Global Title (GTT)
Global Title Translation (GTT)
Initial Address Message (IAM)
Integrated Service Control Point (ISCP)
Integrated Services Digital Network (ISDN)
Integrated Services Digital Network User Protocol (ISUP)
Intelligent Network (IN)
Interchangeable Numbering Plan Area (INPA)
International Standards Organization (ISO)
Internet Gateway Router (IGR)
Internet Routing Records (IRR)
Internet Service Provider (ISP)
Local Access and Transport Area (LATA)
Local Area Number Portability (LANP)
Local Exchange Carrier (LEC)
Location Routing Number (LRN)
Message Signaling Unit (MSU)
Network Control Point (NCP)
Network Node Address (NNA)
Non-Geographic Number (NGN)
North American Numbering Plan (NANP)
Open Systems Interconnection (OSI)
Origination Point Code (OPC)
Person Locator Telephone Number (PLN)
Point in Call (PIC)
Point in Routing (PIR)
Point of Presence (POP)
Query on Release (QOR)
Release-to-Pivot (RTP)
Service Control Point (SCP)
Service Creation Environment (SCE)
Service Switching Point (SSP)
Signal Transfer Point (STP)
Signal Control Point (SCP)
Signal Switching Point (SSP)
Signaling Point (SP)
Signaling Switching Point (SSP)
Signaling System 7 (SS7)
Signaling Transfer Point (STP)
Software Defined Network (SDN)
Traffic Service Position System (TSPS)
Transaction Capabilities Applications Protocol (TCAP)
Universal Global Translation (UGT)

BACKGROUND ART

Local Exchange Carriers have for some years provided customers with a switch based call forwarding service. In recent years the availability and sophistication of this service has been expanded using the added capabilities afforded through the use of common channel interoffice signaling (CCIS) and particularly Signaling System 7 (SS7). SS7 facilitated the introduction of a variety of services referred to as custom calling services. These generally include by way of example, call forwarding, call blocking, caller ID, E911, and others. Representative samples of systems of this general type are described, by way of example, in U.S. Pat. No. 5,377,186 issued to Wegner et al. Dec. 27, 1994, U.S. Pat. No. 5,384,831 issued to Creswell et al. Jan. 24, 1995, U.S. Pat. No. 5,425,090 issued to Orriss Jun. 13, 1995, U.S. Pat. No. 4,313,035 issued to Jordan et al., U.S. Pat. No. 5,206,901 issued to Harlow, U.S. Pat. No. 5,243,645 issued to Bissell et al., and U.S. Pat. No. 5,481,603 issued to Gutierrez et al.

The Wegner et al. Patent describes a system for retrieving enhanced subscriber services from a database and for delivering those services to the subscribers of a telecommunications network without requiring the upgrading of local switches. The architecture of the system comprises a plurality of local switches that are connected to an Advanced Intelligent Network (AIN) to provide the subscribers with access to the network. The local switches utilize an ISUP call-setup-protocol that allows access to a modified SCP known as a virtual circuit service switching point to retrieve subscriber services from the data base. A virtual service switching point (ViSSP) is created by modifying only the serving SCP to include Integrated Services Digital Network User Protocol (ISUP) which provides a second route for call signaling and voice channels. The high speed operation of ViSSP is used to improve response times for activation of enhanced services while reducing the capital investment necessary in the prior art to upgrade all LSs in the network.

The Creswell et al. Patent describes a public switched telephone network adapted to provide a common platform for the provision of customer controlled features. An adjunct is operative for providing personal telecommunications services such that a subscriber may associate different call identifiers with different specifications to define respective call treatments. These features could include forwarding a telephone call associated with a call identifier to one of a number of different destinations.

Calls are treated on a per call basis and are handled in both incoming and outgoing modes dependent upon the called or calling number. While voice mail is an primary objective of the service, additional services include ring through, alternative billing and routing. For example, outgoing calls may be billed to a number other than the phone from which the call was placed. Call forwarding is available as well as enhanced services, as illustrated in FIG. 7. The system uses *codes to activate services stored in personalized files in a server at the basic adjunct.

A public switch telephone network 100 (FIG. 1) includes switching offices 110, 130 and 140 connected through central offices 10 and 20 with stations S1 through S6. Service adjunct 150 operates to process a call associated with one of the subscribers. Voice message service 200 receives voice messages from a calling party via adjunct 150 and network 100. The voice message is addressed to a party who has subscribed to the voice message service that stores messages. A subscriber can dial up service 200 via adjunct 150 and enter a PIN or password. The PIN unloads, from its internal memory, the voice message and transmits the message to the called party's station set via a network connection established between the subscriber set and service.

A subscriber may subscribe to the service and be given a unique telephone number that is permanently assigned to the subscriber as long as the subscriber subscribes to the service. The subscriber can customize calling features by dialing his/her service number to establish a network 100 connection to adjunct 150. In this manner, the subscriber can customize his/her associated record to invoke particular calling call forwarding.

The Orriss Patent describes embodiments of an AIN system in the context of an "800" service. SSP 230 (FIG. 4) triggers generation of the "800" query to the consolidated AIN/800 ISCP 310 in response to receipt of an "800" service call received from the telephone 112. Processor 312 runs the "800" service application 156 to identify the corresponding "800" service record in the "800" CMSDB 314. An "800" response, generated according to the turnaround record contained in the "800" service record, directs the AIN SSP 230 to route the call to an AIN-equipped trunk group. The AIN SSP 230 then routes the original call via a trunk group designated in the AIN response and completes the call according the AIN service instructions contained in the AIN response.

Jordan et al., U.S. Pat. No. 4,313,035 discloses a method of using an intelligent network to provide a person locator service through multiple exchanges of the switched telephone network using an AIN type of telephone system architecture. As part of this service, the system provides subscriber access to the subscriber's data in the central data base of the intelligent network, to input data for controlling the person locator service.

Each subscriber to the locator service has a unique person locator telephone number (PLN). To access the system to update data in the data base, the subscriber dials 0700 and his unique person locator telephone number. The telephone switching office routes the call to a traffic service position system (TSPS), which prompts the caller (e.g., provides an additional dial tone) and receives further digits from the subscriber. The subscriber inputs a three digit access code, indicating the type of update call, and a four digit personal identification number. If calling from the remote station to which the subscriber wishes his calls routed, the local switching office forwards the line identification number of that station to the TSPS. The TSPS forwards the dialed information and the line identification to the data base for updating the particular subscriber's location record.

An absent subscriber can input a number to which calls are to be completed, such as the number where the subscriber can be reached, into the central data base. A caller wishing to reach the subscriber dials the subscriber's unique person locator number. A telephone switching office having access to CCIS sends the dialed number to the central data base. The data base retrieves the stored completion number for the called subscriber and forwards that number back to the switching office to complete the call.

Harlow, U.S. Pat. No. 5,206,901 discloses use of an Intelligent Network to translate the directory number of an incoming call into one or more identifications of lines served by a local switching system, and one or more directory numbers not served by the local switching system. The system provides both landline telephone services and mobile telephone services.

Bissell et al., U.S. Pat. No. 5,243,645 discloses an intelligent network (IN) type system for forwarding a traveling subscriber's incoming calls to a different location identified by an automatic registration performed when the subscriber engages in a business transaction or activity that indicates his or her location. The transaction/activity can be any action that initiates updating of the electronic data base with information that directly or indirectly indicates the subscriber's identity and whereabouts. Examples include the use of a credit card at a location such as a hotel or airport, the making of a long distance telephone call with a credit card that identifies the subscriber or the use of an Automated Teller Machine (ATM).

Gutierrez et al., U.S. Pat. No. 5,481,603 discloses an intelligent network with selective routing of queries among a plurality of network control point (NCP) databases. Each end office switch has an associated global title translation (GTT) database, implemented, for example, as an element of a CNI ring interface to the SS7 (signaling system 7). signaling links. When a switch receives a call that requires intelligent call processing, such as a "software defined network" (SDN) call or an 800 call, the switch routes a query to the associated GTT database. This query fully identifies the calling station, for example by its 10 digit telephone number. The GTT database uses the calling station identification to identify the particular NCP in the telecommunications network that contains the appropriate record for completing the call. Assuming that the GTT database includes an identification of the NCP, the GTT database provides that information to the switch. The switch subsequently queries the particular NCP directly, to obtain the call processing information necessary to complete the call.

If the GTT database associated with the particular switch does not contain an appropriate entry, or an error condition exists, the GTT database so informs the switch. In response, the switch launches a further query to a centralized database, called a "universal global translation" (UGT) database. The UGT database stores appropriate GTT translations identifying the correct NCP database for each subscriber. In response to the query from the switch, the UGT database retrieves information identifying the customer ID and the particular NCP in the telecommunications network that contains the appropriate record for completing the call, and provides this information to the originating switch. The switch subsequently queries the particular NCP directly, to obtain the call processing information necessary to complete the call.

In the case where the GTT database did not include the appropriate record, the information obtained from the UGT database is also provided to and stored in the GTT database. Thus, the GTT database is "self provisioning", in that it will thereafter contain the appropriate information to avoid another query to the UCT database when the same calling station originates a subsequent call.

Other patents dealing with this general approach include Weber U.S. Pat. No. 4,191,860, issued Mar. 4, 1980, and Josephs U.S. Pat. No. 5,425,091, issued Jun. 13, 1995.

The Problem

In all of these prior systems the hardware and software involved are established, maintained, and controlled by the telephone companies, usually the Local Exchange Carrier (LEC). This imposes limitations on the universality of conditions under which custom services such as, by way of example, call forwarding, call blocking, and others may be offered and implemented. None of the foregoing prior art arrangements provides a system for expedient implementation of such services in a manner which lends itself to widespread adoption under varying circumstances with a minimum of alteration of telephone and other networks involved.

DISCLOSURE OF THE INVENTION

A. Objects of the Invention

It is an object of the invention to provide a system and methodology for providing efficient and economical call forwarding and other custom services for multi-carrier telephone networks operating over large geographic regions.

It is another object of the invention to provide a system and database method of call forwarding and other custom services using a readily established and virtually universally accessible database or system of databases and network for accessing such databases.

It is yet another object of the invention to provide a system and database method of call forwarding and other custom services using a database or system of databases in the Internet.

It is yet another object of the invention to provide a system and database method of call forwarding and other custom services using a database or system of databases in a wide area packet internetwork to obviate and avoid the problems previously encountered in attempts to mesh the control networks or plural carriers.

It is another object of the invention to provide a system and methodology for providing both-inter carrier and inter-exchange call forwarding and other custom services regardless of whether one or plural carriers are involved and regardless of whether such carriers utilize CCIS or the same variety of CCIS.

It is yet another object of the invention to provide a system and database method of call forwarding and other custom services using a database or system of databases in the Internet in conjunction with either or both common channel signaling or in band signaling.

It is another object of the invention to provide a system and methodology for providing call forwarding and other custom services which is usable in combinations of networks wherein a connection with the desired party or facility does not rely solely on use of telephone networks.

It is another object of the invention to provide a system and methodology for providing call forwarding and other custom services which are usable to establish voice communication with users who are reachable only through non-telephone networks, such as the Internet.

B. Summary of the Invention

According to a preferred embodiment of the invention the dialing of a directory number which has been forwarded triggers an intelligent network (IN) signal which is directed to a gateway router to the Internet. From the Internet Gateway Router (IGR) the signal is transmitted to a database or series of databases in the Internet. This database or series of databases return call setup or routing directions which are then used by the originating network to establish a link to the station having the forwarded number. The intelligent network signal may be transmitted from a signal switching point (SSP) in the originating network to a signal transfer point (STP) and signal control point (SCP) to the Internet gateway router.

Alternatively and preferably the intelligent network signal is so coded as to proceed directly from the signal transfer point to the Internet gateway router. From the Internet gateway router the signal is directed to an Internet database where the forwarding number is obtained. This is transmitted in TCP/IP format back to the gateway router. The gateway router transmits a signal in appropriate IN format to the switching point, which then uses the forwarding number to complete the connection. In yet another situation, where a number has been forwarded to a station that is connected only to the Internet, the Internet database may provide an IP address, such as, for example, www.xxxxxxxx.tel. This address is then used to establish a link through the Internet between the originating Internet gateway router and a terminating Internet gateway router determined by the address www.xxxxxxxx.tel, and thence to the station to which the call has been forwarded. In this instance the Internet gateway routers may or may not handle both the signaling and voice connections.

The use of an Internet database or databases facilitates a greater universality and applicability of the number forwarding system and other custom services. Both common channel signaling and in band signaling may be utilized. The new arrangement facilitates the use of address systems which transcend existing telecommunications numbering systems. The Internet is virtually universally accessible and can ameliorate requirements for interfacing different types of signaling parameters which may be used by different carriers and networks.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BEST MODE FOR CARRYING OUT THE INVENTION

Figure 1:
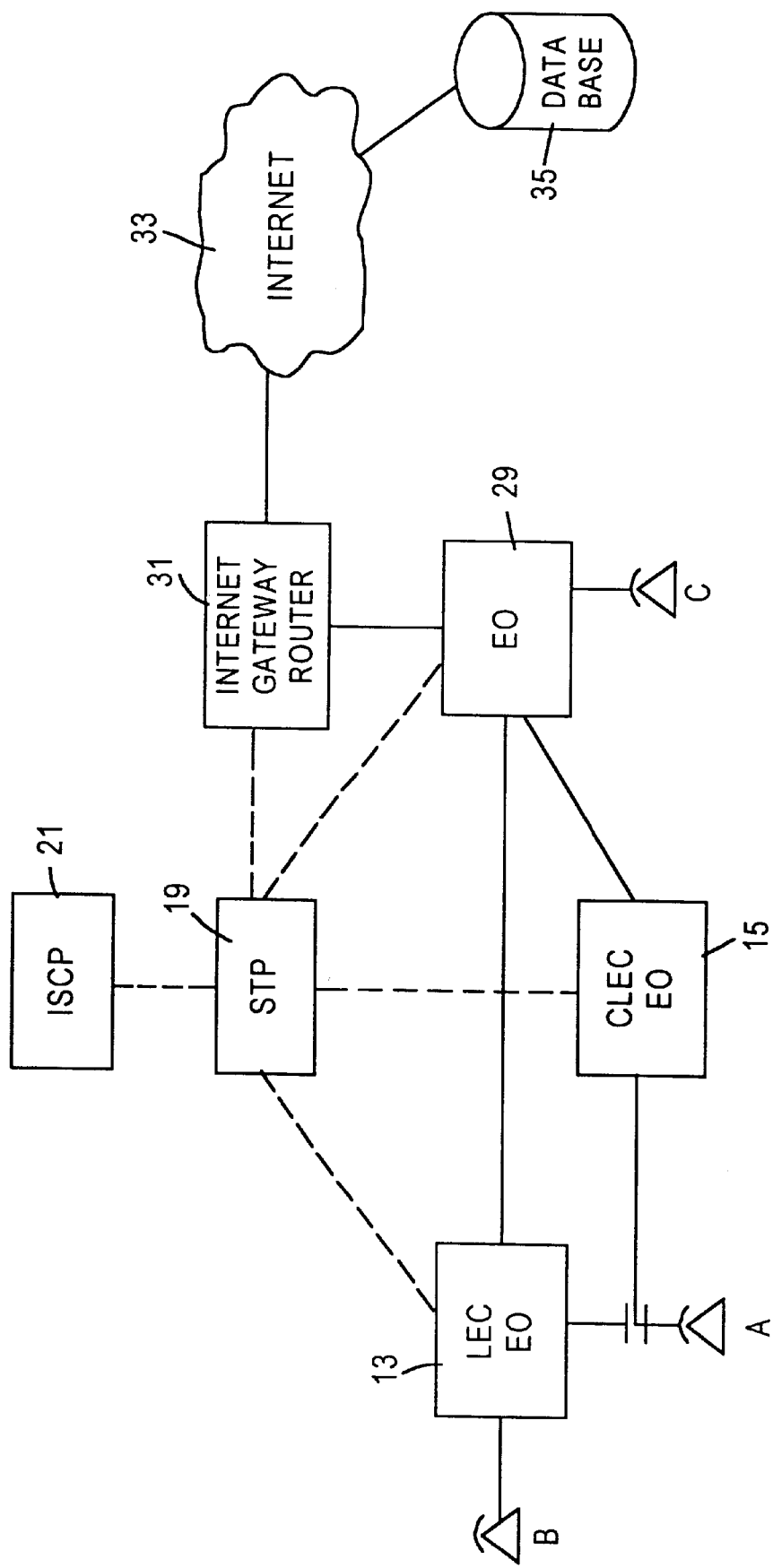
FIG. 1 is a simplified block diagram of the architecture of a network system arranged to implement one embodiment of number portability according to the invention.

Referring to FIG. 1 there is shown one preferred embodiment of the invention. According to this arrangement a telephone network is provided wherein a customer at station A may obtain local exchange telephone service from either a local exchange carrier (LEC) 13 or a competing local exchange carrier (CLEC) 15. In the illustrated example, the customer at station A originally received service through the LEC end office 13. However, the customer has now selected the competing carrier CLEC 15 for local service. Accordingly, the station A now connects to the CLEC end office 15. The CLEC end office 15 may connect through a tandem switch or trunk circuits to each LEC end office in the area of service. However, for convenience the end office 15 is shown connected to the end office 29. In this example the CLEC end office 15 is also shown as connected into the common channel interoffice signaling network via STP 19 and ISCP 21.

According to the invention the network is provided with an Internet Gateway Router (IGR) 31, which is connected to the STP 19 by a data link and to the Internet, shown as cloud 33. For purposes to be described, the Internet Gateway Router 31 is also connected by a voice link to the end office 29. Also connected to the Internet 33 is an address and telephone number database 35. The database 35 stores telephone number translations of the same general type as the ISCP database in addition to Internet addresses. The storage of addresses may be similar in nature to data stored in the Internet database described in parent application Ser. No. 08/670,908, filed Jun. 26, 1996. Thus the database 35 may be distributed and operate in a manner similar to the distributed database that is used in the Domain Name Service (DNS) servers in the Internet, as is described in further detail hereinafter. The Internet Gateway Router may also be similar in nature to that described in the parent application.

The Internet utilizes Transmission Control Protocol (TCP)/Internet Protocol (IP) or TCP/IP. A Defense Data Network (DDN) standard establishes criteria for an Internet Protocol (IP) which supports the interconnection of communication LANs.

It introduces the Internet Protocol's role and purpose, defines the services provided to users, and specifies the mechanisms needed to support those services. The standard also defines the services required of the lower protocol layer, describes the upper and lower interfaces, and outlines the execution environment services need for implementation.

A Transmission Control Protocol (TCP) is a transport protocol providing connection-oriented, end-to-end reliable data transmission in packet-switched computer LANs and internetworks.

The Internet Protocol (IP) and the Transmission Control Protocol (TCP) are mandatory for use in all DoD packet switching networks which connect or have the potential for utilizing connectivity across network or subnetwork boundaries. Network elements, such as hosts, front-ends, gateways, etc., within such networks which are to be used for internetting must implement TCP/IP.

The Internet Protocol is designed to interconnect packet-switched communication LANs to form an internetwork. The IP transmits blocks of data, called Internet datagrams, from sources to destinations throughout the Internet. Sources and destinations are hosts located on either the same subnetwork or on connected LANs. The IP is intentionally limited in scope to provide the basic functions necessary to deliver a block of data. Each Internet datagram is an independent entity unrelated to any other Internet datagrams. The IP does not create connections or logical circuits and has no mechanisms to promote data reliability, flow control, sequencing, or other services commonly found in virtual circuit protocols.

The DDN standard specifies a host IP. As defined in the DoD architectural model, the Internet Protocol resides in the internetwork layer. Thus, the IP provides services to transport layer protocols and relies on the services of the lower network protocol. In each gateway, a system interconnecting two or more LANs, an IP resides above two or more LAN's protocol entities. Gateways implement IP to forward datagrams between LANs. Gateways also implement a routing protocol to coordinate signaling and other Internet control information.

Various Network Access Protocols reside below the IP and may include, by example, an Ethernet protocol or an X.25 protocol.

Figure 2:
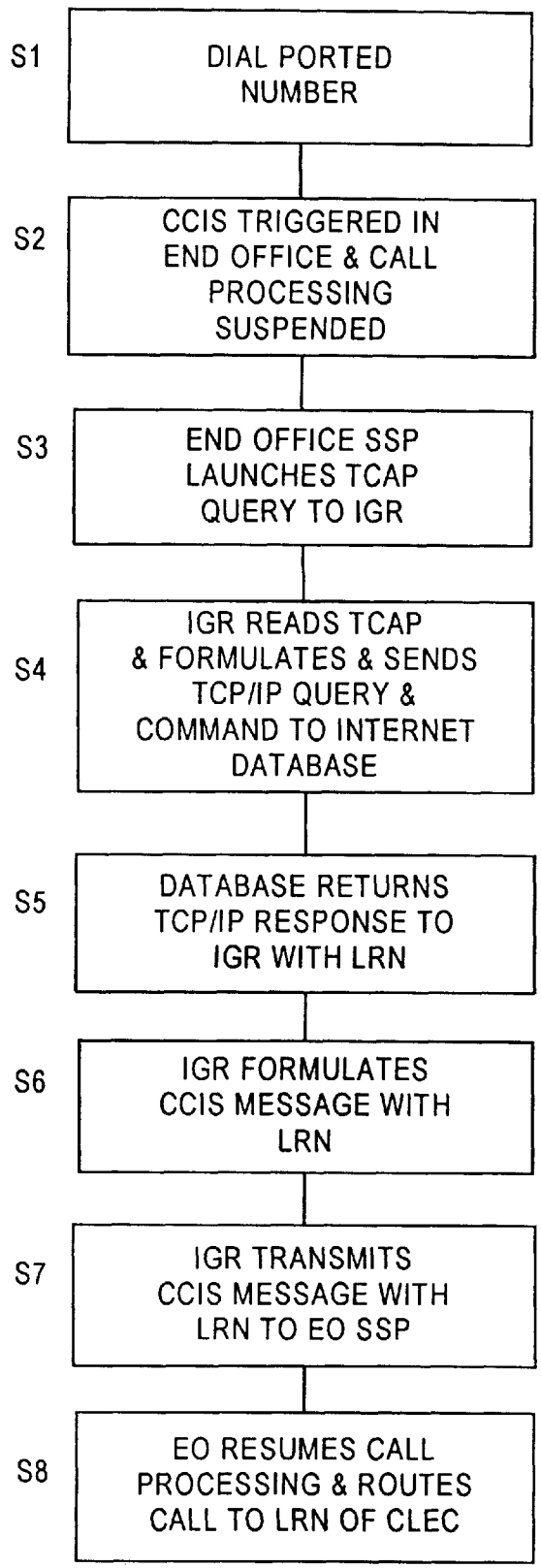
FIG. 2 is a simplified flow chart diagram of the operation of the embodiment of FIG. 1.

In completion of a call to a directory number which has been ported from the LEC to the CLEC, the system of the embodiment of the invention shown in FIG. 1 may operate in the following manner. FIG. 2 is a simplified flow chart diagram of the operation. The chart shows the exchange of signaling messages used to set up an interoffice call to a ported number using one embodiment of the invention.

Assume that the caller at station B dials the ported telephone number (703) 236-5432 at S1. In the originating end office 13, a trigger has been set against the NPA-NXX codes (236 and/or 703-236) for the LEC end office 13. Detection of the dialing of the 236 code therefore triggers common channel signaling processing by the end office 13. The end office 13 suspends call processing at S2 and launches a Transaction Capabilities Applications Protocol (TCAP) type query at S3. According to the invention the TCAP type query goes through a signaling transfer point (STP) 19 to the Internet Gateway Router 31.

The TCAP query includes a variety of data fields containing information about the call. For purposes of this discussion, the significant field in the query is the called party number field (CPN). The Internet Gateway Router thereupon performs a dip or look-up in the database 35. In the initial query to the Internet database 35, the CPN field contains the dialed number (236-5432 or 703-236-5432).

One number in the range of numbers assigned to the CLEC end office 15 is designated as a local routing number (LRN). In the example it is assumed that the LRN for the end office 15 is 703-555-9999. The Internet database will have a table translating all ported numbers into the LRN for the CLEC end office serving the telephone line of the ported number customer. In the example, the table translates 703-236-5432 into 703-555-9999. The table will include no entries for numbers still resident in the LEC end office having the called party number NPA-NXX, i.e., for numbers not ported. In the example under consideration, the called number is a ported number, and the Internet database table contains an entry.

The Internet Gateway Router translates the protocol of the received SS7 query and addresses a TCP/IP query to the database 35 at S4. This query is transmitted and seeks from the database 35 the LRN for the CLEC for the ported number. This is indicated at S4. The database performs a dip, obtains the LRN, and returns a TCP/IP response to the Internet Gateway Router 31. At S5 the Gateway Router obtains this TCP/IP response containing the requested LRN from the database. At S6 the Internet Gateway Router 31 formulates a TCAP response message including the LRN based on the TCP/IP response. In this example, the Internet Gateway Router 31 formulates a TCAP type response message with the LRN placed in the CPN field of the response. In the example, the CPN in the response is 703-555-9999, the LRN of the CLEC end office 15. The Internet Gateway Router 31 transmits the response message back through the STP 19 to the originating end office 13 in SS7 format at S7.

Upon receipt of the response message, the end office 13 resumes its processing of the call, based on the information contained in the response message. In particular, the end office 13 uses the CPN number from the response message to route the call in an otherwise normal manner. Since the dialed number was a ported number, the CPN in the response message is an LRN. In the example, the CPN in the response is 703-555-9999. The originating end office 13 utilizes the LRN to route the call to the CLEC end office 15 at S8.

Routing of the call to the CLEC end office 15 includes a transmission and reception of a number of common channel signaling messages by the originating end office 13. The first of these messages is an Initial Address Message (IAM) type message transmitted from the originating end office to the terminating end office 15. For a ported number call, the IAM message will contain the LRN (703-555-9999) in the CPN field. The IAM message also includes a generic address parameter (GAP) field. The originating end office 13 places the actual destination number (703-237-5432) in the GAP field of the IAM, for each call to a ported number as indicated by the presence of an LRN in the response from the Internet Gateway Router 31. The originating end office 13 also sets the m-bit in the forward call indicator parameter of the IAM to '1', to indicate to any subsequent switch in the call path that the number portability query has already been completed for this call.

The CLEC end office 15 will recognize the IAM message with the LRN in the CPN field as a message relating to a call to a ported number, therefore the CLEC end office 15 will utilize the number in the GAP field as the actual destination number. After the IAM message, the CLEC end office 15 will process the call in the normal manner to determine availability or busy status and ring and complete the call to the station A, if available.

If the caller calls a number that normally resides within the exchange that serves the calling party, the internal switch translations will determine how the call is routed. For example, if a caller at station B calls another number with the NPA of 236, the LEC end office 13 utilizes its internal translations. If the switch still provides telephone service for that number, the end office 13 completes the call in the normal manner. If the call is to a ported number, such as 236-5432, then the switch translation will provide the LRN (e.g., 555-9999). The end office 13 then routes the call through the CLEC end office 15 using the LRN as the CPN and using the destination number as the GAP, in the same manner as for the exemplary call from station B to station A discussed above.

Figure 3:
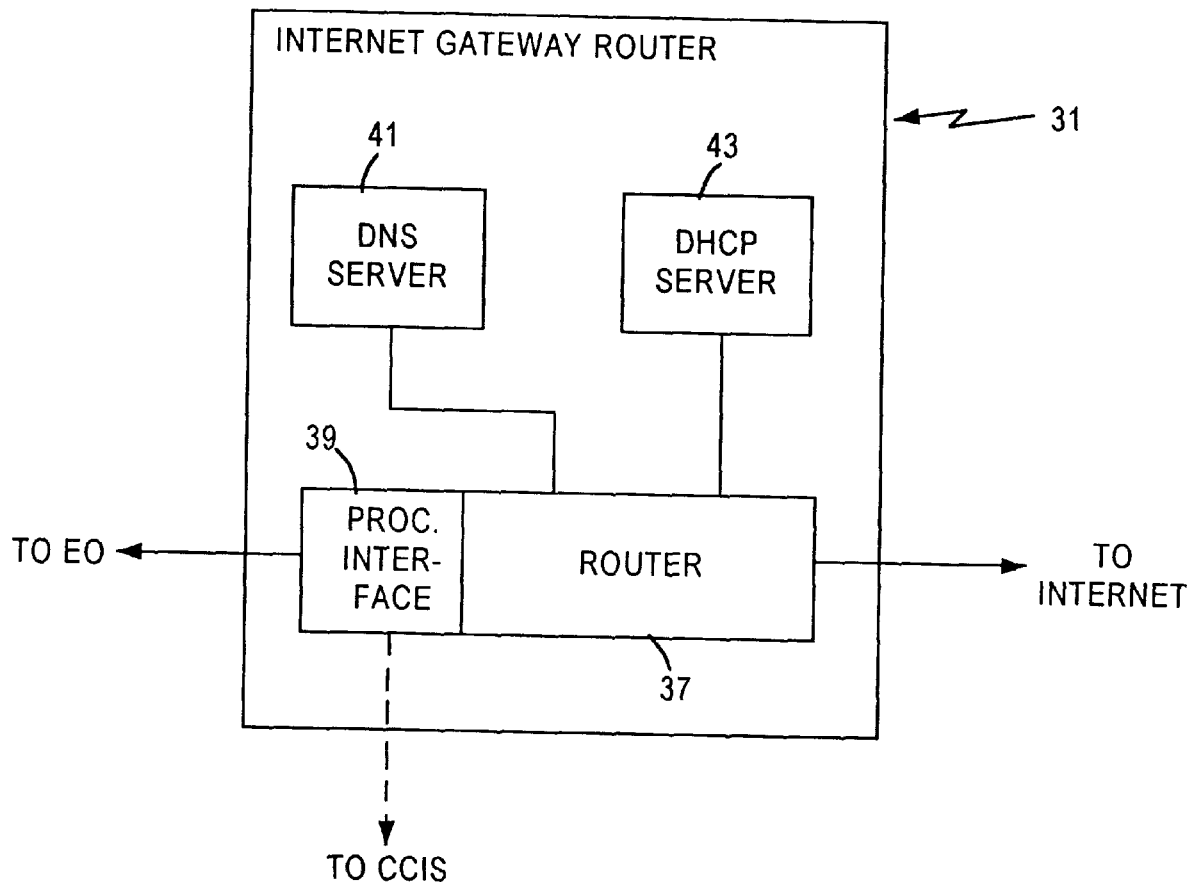
FIG. 3 is a simplified block diagram showing one form of gateway router for use with the invention.

The Internet Gateway Router 31 may be of the type shown in FIG. 3. The Internet Gateway Router, generally indicated at 31, includes a router 37 of the type now generally used in Internet practice, such as shown in FIG. 1 of parent application 08/670,908, which is incorporated for reference herein in its entirety. For performing some functions which may be utilized in the system the router may be provided with an interface with processing capability as illustratively shown at 39. Connected to the router are a Domain Name Service (DNS) server 41 and a Dynamic Host Configuration Protocol (DHCP) server 43 of the type conventionally used by Internet Service Providers (ISPs) in existing Internet Service. The router interface is connected to the central office and to the CCIS network while the router is connected to the Internet.

It will be appreciated by those skilled in the art that the DNS is a distributed database that holds the domain names and IP addresses of all the registered systems on the Internet. With Internet servers located all over the world, DNS translates the names to addresses and back. Individual DNS servers contain only a limited amount of information, because they know where to find details on domains they have yet to encounter. If an individual server does not contain information for a specific domain name, it passes the request along the hierarchy of servers until the information is found. In practice this means that the request can be handled by any number of servers in the constantly changing Internet. The server that originally made the request will cache the information to satisfy future requests without the need to go to an authoritative server, i.e., a server which has the desired information. It will also be understood that if the IP address is initially stated in its ultimate number form, the DNS translation is unnecessary.

It is an advantage of the invention that number portability may be provided with respect to numbers assigned to stations which can be reached only through the Internet. Among other advantages, this feature provides operability over greatly expanded geographic areas which may be international. The use of the hierarchical DNS techniques for the DNS and for the database 31 permits virtually unlimited expansion possibilities.

Figure 4:
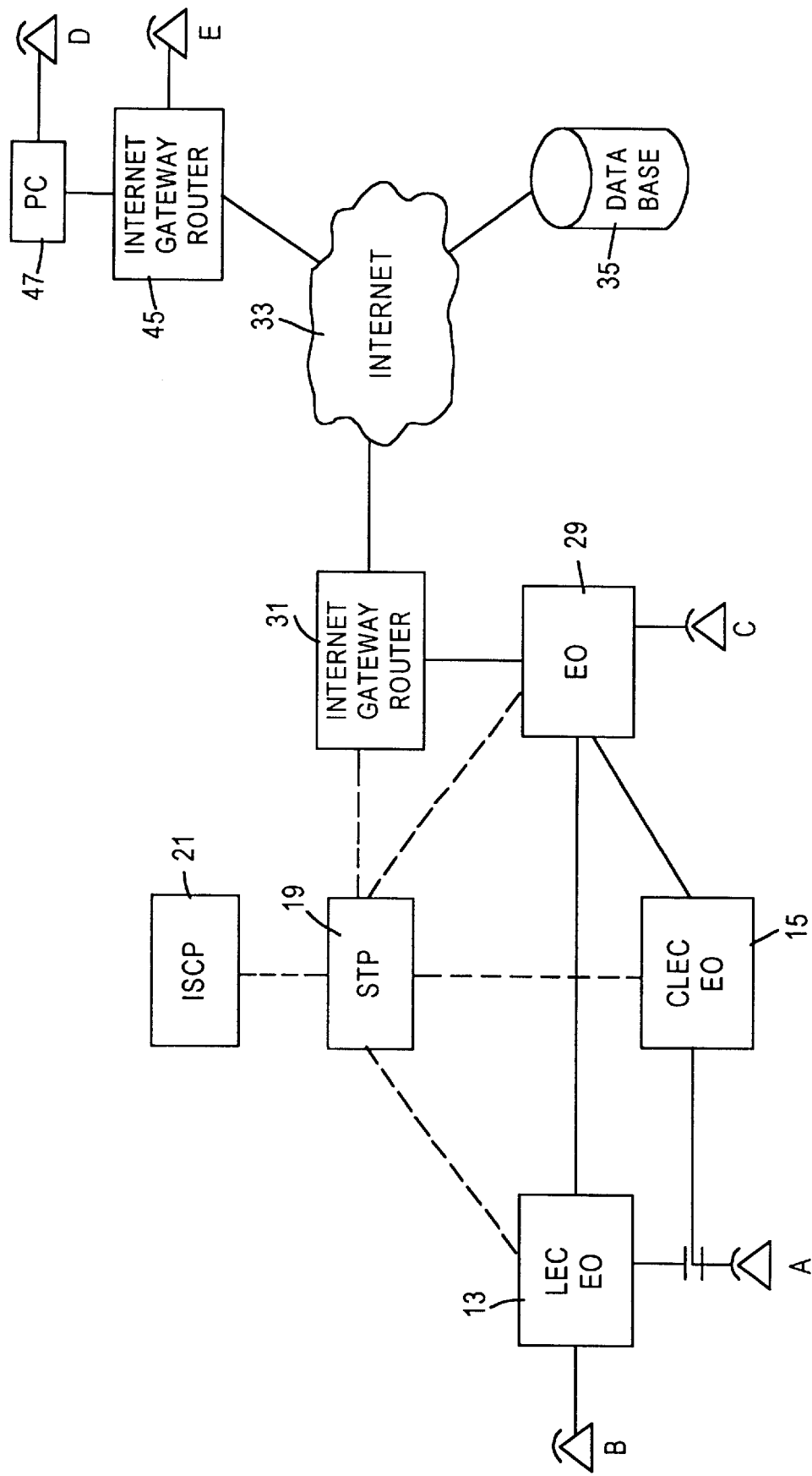
FIG. 4 is an illustration of a network similar to that in FIG. 1 showing an embodiment of the invention which implements number portability in a situation where the station to which the ported number is assigned may be reached only through the non-telephone company network.

According to a first embodiment of this feature of the invention there is shown in FIG. 4 a network similar to that illustrated in FIG. 1 wherein like reference numerals are used. In this arrangement a second Internet Gateway Router 45 is connected to the Internet and to a station D which is connected directly to the Internet Gateway Router 45 through a processor such as a PC 47. Station D may be reached only through the Internet. The station D may be a plain old telephone station (POTS) or may constitute a computer microphone and speaker or headset arrangement, such as the type described in the parent application. In this embodiment it is assumed that the subscriber customer formerly had subscribed to telephone service from an LEC and had a conventional DNA-NXX-XXXX telephone number assigned. By way of example, it is assumed that the former subscriber has moved and presently desires an Internet only telephone connection to which his/her DNA-NXX-XXXX number will be ported.

Figure 5:
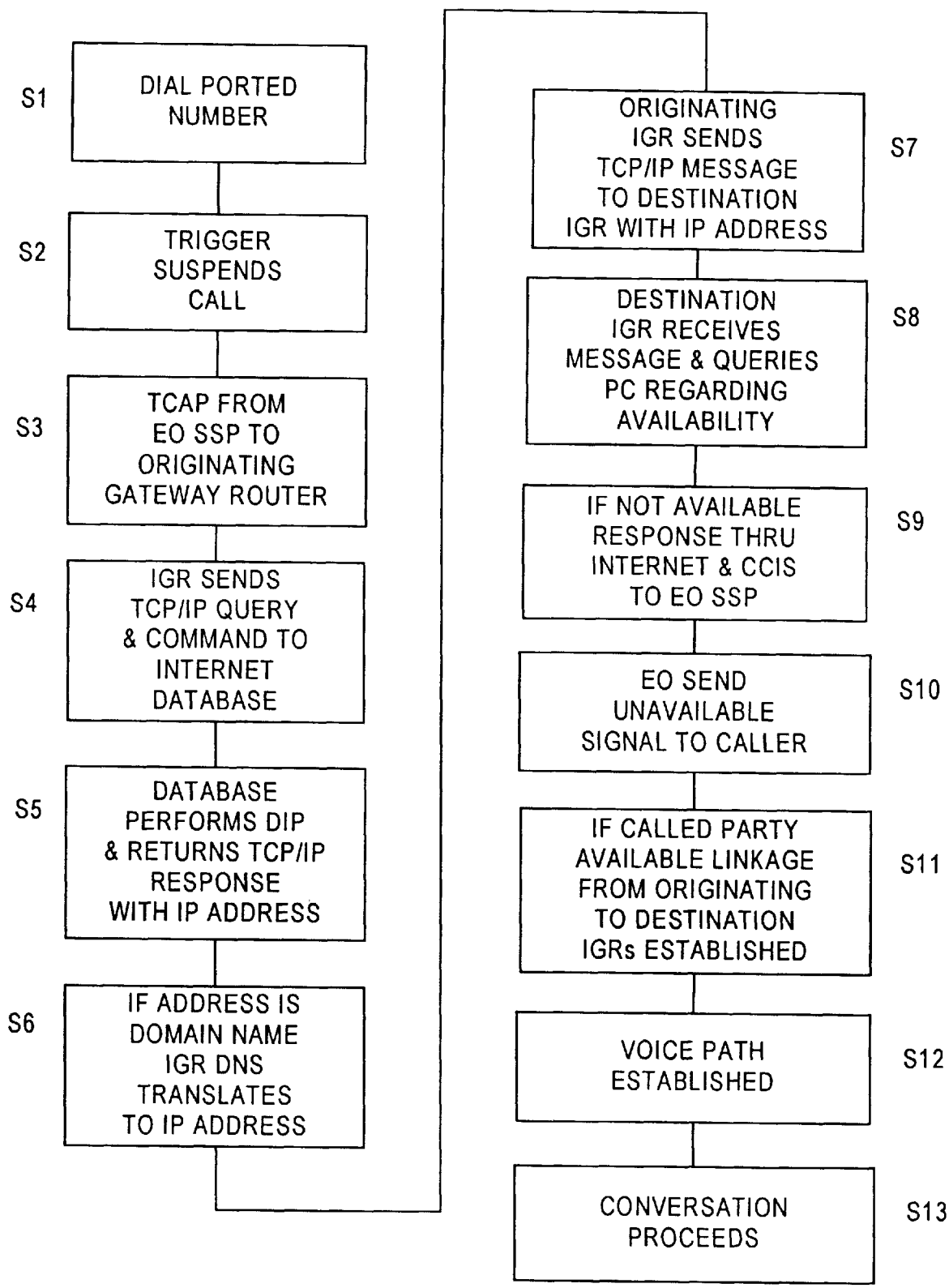
FIG. 5 is a simplified flow chart of the operation of the system illustrated in FIG. 4.

According to this embodiment of the invention the subscriber is possessed of a domain name Internet address and maintains his/her processor or PC in a continuously energized condition. In this embodiment of the invention the Internet database 35 is provided with a translation table or tables which not only provide translations from telephone number to telephone number but also provide translations from ported telephone number to Internet addresses. In this instance the translation table for the ported number for the station D provides an Internet address for the processor or PC 47. A simplified flow chart of the operation is presented in FIG. 5. Such operation proceeds in the following manner.

At S1 a caller dials the ported number DNA-NXX-XXXX of the subscriber at station D. This triggers the suspension of the call at S2. At S3 the originating end office switching system and associated SSP transmit a query TCAP message to the Internet Gateway Router 31. This message includes the ported number that was dialed. At S4 the Internet Gateway Router formulates and transmits a TCP/IP query or command through the Internet to the database 35, seeking retrieval of the present number of the subscriber. The database performs a data dip, i.e., searches its tables, and dispatches a response to the inquiring Internet Gateway Router 31. This response forwards the Internet address corresponding to the ported number. This is shown at S5. If the address returned by the database is in the form of a domain name, the Internet Gateway Router performs a translation to the Internet address at S6.

At S7 the originating Internet Gateway Router 31 formulates or assembles a TCP/IP packet (or packets) message and transmits the message through the Internet to the destination Internet Gateway Router 45. This message includes the address of the destination Internet Gateway Router 45, the originating Internet Gateway Router 31, and the Internet address of the subscriber at station D. The destination Internet Gateway Router 45 receives the message at S8 and queries the processor or PC 47 to determine if the called party is available. If the party is not available, signaling messages to that effect are returned through the Internet and common channel signaling network to the calling end office SSP in inverse fashion at S9. The calling end office thereupon returns a busy or not available prompt to the caller at S10. If the called party is available a TCP/IP linkage from originating Internet Gateway Router 31 to destination Internet Gateway Router 45 is established at S11. The Internet Gateway Routers at the originating and terminating ends perform the translation from voice to TCP/IP packets to voice signals and a voice path is established through end office 29 and originating end office 13 at S12. The conversation thereupon proceeds at S13.

While the embodiment of the invention shown in FIG. 4 utilized a processor or PC 47 at the premises of the subscriber, it is also a feature of the invention that the processing which occurs at that site may alternatively be performed at the site of the Internet Gateway Router and a voice message delivered to the telephone station D. Such an embodiment is illustrated in FIG. 4 by station E connected directly to Internet Gateway Router 45. The destination Internet Gateway Router 45 performs the processing previously performed in processor or PC 47 in FIG. 4.

Figure 6:
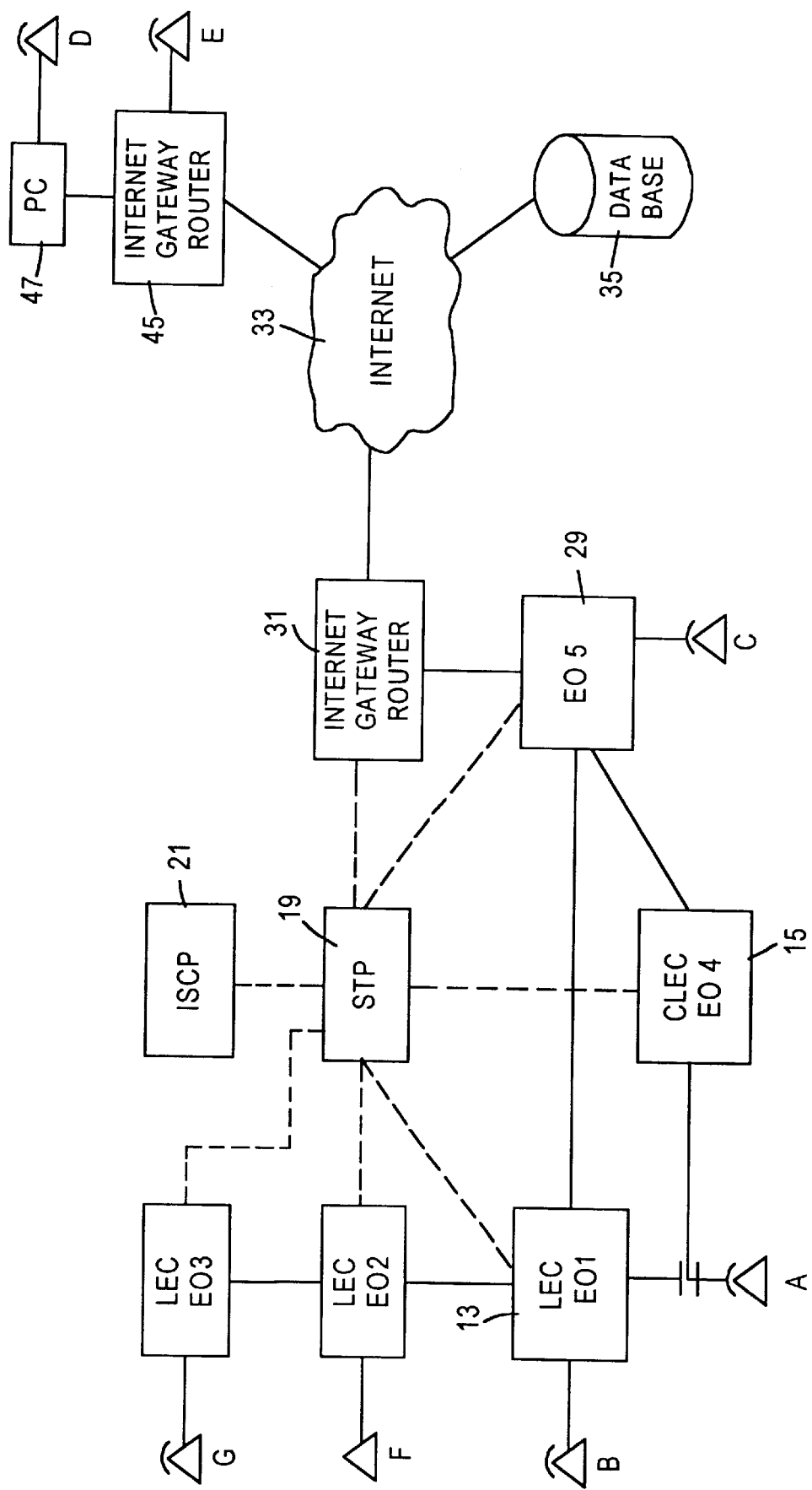
FIG. 6 is an illustration of a network similar to that in FIG. 1 showing an embodiment of the invention which implements call forwarding.

Referring to FIG. 6 there is shown another preferred embodiment of the invention. In FIG. 6 there is shown a network similar to that in FIG. 4 wherein the LEC is shown with a plurality of end offices EO1, shown at 13 as in FIG. 4, EO2, and EO3. The offices are shown connected be connected via one or more tandems (not shown). The LEC end offices are connected to the STP 19 by data links shown as broken lines. Each end office serves a plurality of customer premises stations which are here shown illustratively as the telephone stations B, F, and G. The CLEC likewise comprises multiple end offices EO4 and EO5, which are trunked together and serve customer premises stations here illustrated as telephone stations A and C. The STP 19 is connected to the Internet Gateway Router (IGR) 31 and thence to the Internet 33 as previously explained. Also as previously described the Internet is connected to the data base 35 and to the Internet Gateway Router 45 which serves the customer PC 47 and the customer premises telephone stations D and E.

According to this embodiment of the invention the database 35 not only provides translations from telephone number to telephone number and Internet addresses but also stores Internet Routing Records (IRR) for all served entities. Among other purposes this storage serves as a repository of call processing records for custom calling services provided to served entities. This includes the services provided to the stations A–G in FIG. 6. Services which may be created and maintained using the IRR include call forwarding, call blocking, call screening, automatic call distribution and like services. According to this embodiment of the invention such services are not constrained to telephone stations served by LECs but may also be provided to nontelephone company connected stations, such as, by way of example, the stations D and E. It will be apparent that the volume of data stored in the database 35 will be large and will grow larger as use of the Internet increases. For this reason the database 35 is preferably a distributed heirarchical database as previously described.

Figure 7:
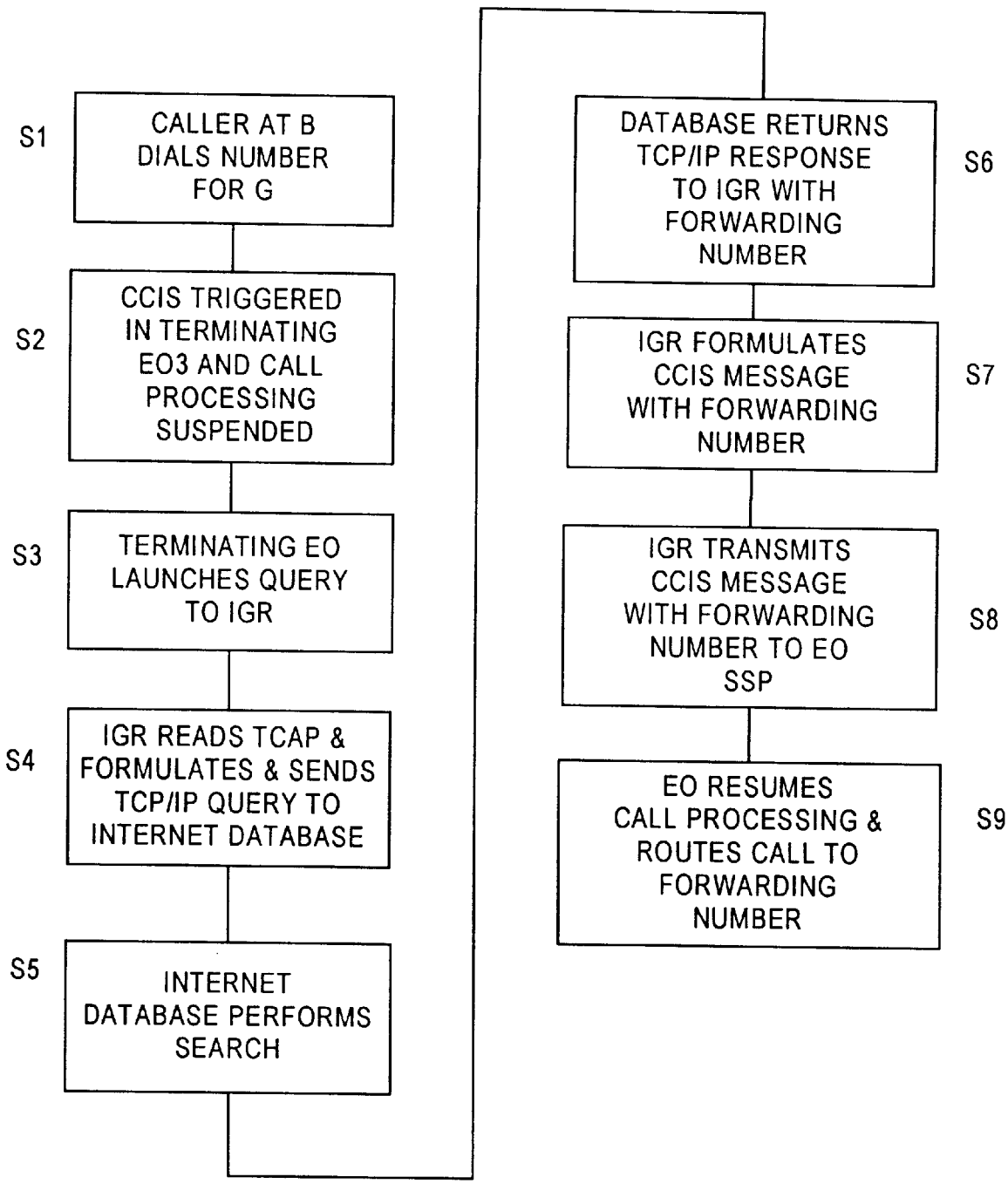
FIG. 7 is a simplified flow chart of one mode of the operation of the system illustrated in FIG. 6.

The operation of the network of FIG. 6 for a call forwarding application is now described in conjunction with the simplified flow chart in FIG. 7. In the embodiment previously discussed with reference to FIGS. 1 and 2 the trigger was set in the originating switch or associated SSP, i.e., an originating trigger was used. In the embodiment now discussed the trigger which is used is a terminating trigger set in the terminating switch or associated SSP. In each situation the SSP is set up to to recognize the dialed number or code for the dialed number as requiring ISUP (Integrated Services Digital Network User Part) call setup. Upon such recognition the switch or SSP sends a query message via the STP to the ISCP when the CCIS is operating in a conventional AIN environment. The operation of such an AIN environment is described in detail in "Bellcore AIN Switching Systems Generic Requirements" GR-1298-CORE, Issue, Dec. 2 1994, which is hereby incorporated by reference.

Referring to FIG. 7, at S1 a caller at telephone station B in FIG. 6 dials the directory number for telephone station G. The subscriber at station G has call forwarding service and has directed that all calls to station G be forwarded to station F. In the terminating end office EO3, a trigger has been set against the NPA-NXX-XXXX code for the subscriber at G. Detection of the dialing of this code at EO3 upon receipt of the IAM CCIS signal indicates that the subscriber to the called number is a subscriber to custom calling services. As a result intelligent common channel signaling processing by the end office EO3 (which is SSP equipped) is triggered.

The end office EO3 suspends call processing at S2 and launches a Transaction Capabilities Applications Protocol (TCAP) type query at S3. The TCAP type query goes through the signaling transfer point (STP) 19 to the Internet Gateway Router (IGR) 31. The Internet Gateway Router translates the protocol of the received SS7 query and sends a TCP/IP query to the database 35 at S4. According to the invention the Internet Routing Record for the custom calling of the subscriber at G has been stored in the IRR database 35. The TCAP query to the IGR 31 includes a variety of data fields containing information about the call. The significant field in the query in this example is the called party number field (CPN). The Internet Gateway Router thereupon so formulates the TCP/IP message as to have the database 35 perform a search or look-up at S5.

The database performs the search, obtains the number to which the call should be forwarded, and returns a TCP/IP response to the Internet Gateway Router 31. At S6 the Gateway Router obtains this TCP/IP response containing the number to which the call should be directed. At S7 the Internet Gateway Router 31 formulates a TCAP response message including this number based on the TCP/IP response. In this example, the Internet Gateway Router 31 formulates a TCAP type response message with the new number placed in the CPN field of the response. The Internet Gateway Router 31 transmits the response message back in SS7 format through the STP 19 to the end office EO3 at S8.

Upon receipt of the response message, call processing is resumed based on the information contained in the response message. In particular, the CPN number from the response message is used to route the call in an otherwise normal manner. Since the dialed number was a forwarded number, the CPN in the response message indicates this number, and that number is used to route the call to the end office EO3 at S9.

In the preceding example the called number and the number to which the subscriber had directed the call to be forwarded were served by the same LEC. It is also a feature of the invention that call forwarding and other custom calling services may be provided in an intercarrier fashion. In the call forwarding example a subscriber may direct call forwarding to a number served by a different LEC or by a CLEC. An example of such operation of the invention is indicated in the simplified flow chart in FIG. 8. In this example the CLEC telephone subscriber at station A has directed forwarding of calls dialed to station A, which was formerly served by the LEC from end office EO1, to station B which is served by the LEC from EO1. In this situation the storage maintained in the Internet Routing Record (IRR) database 35 by the CLEC contains a service profile for subscriber A which directs forwarding calls to the NPA-NXX-XXXX of station A to the NPA-NXX-XXXX of station B.

Figure 8:
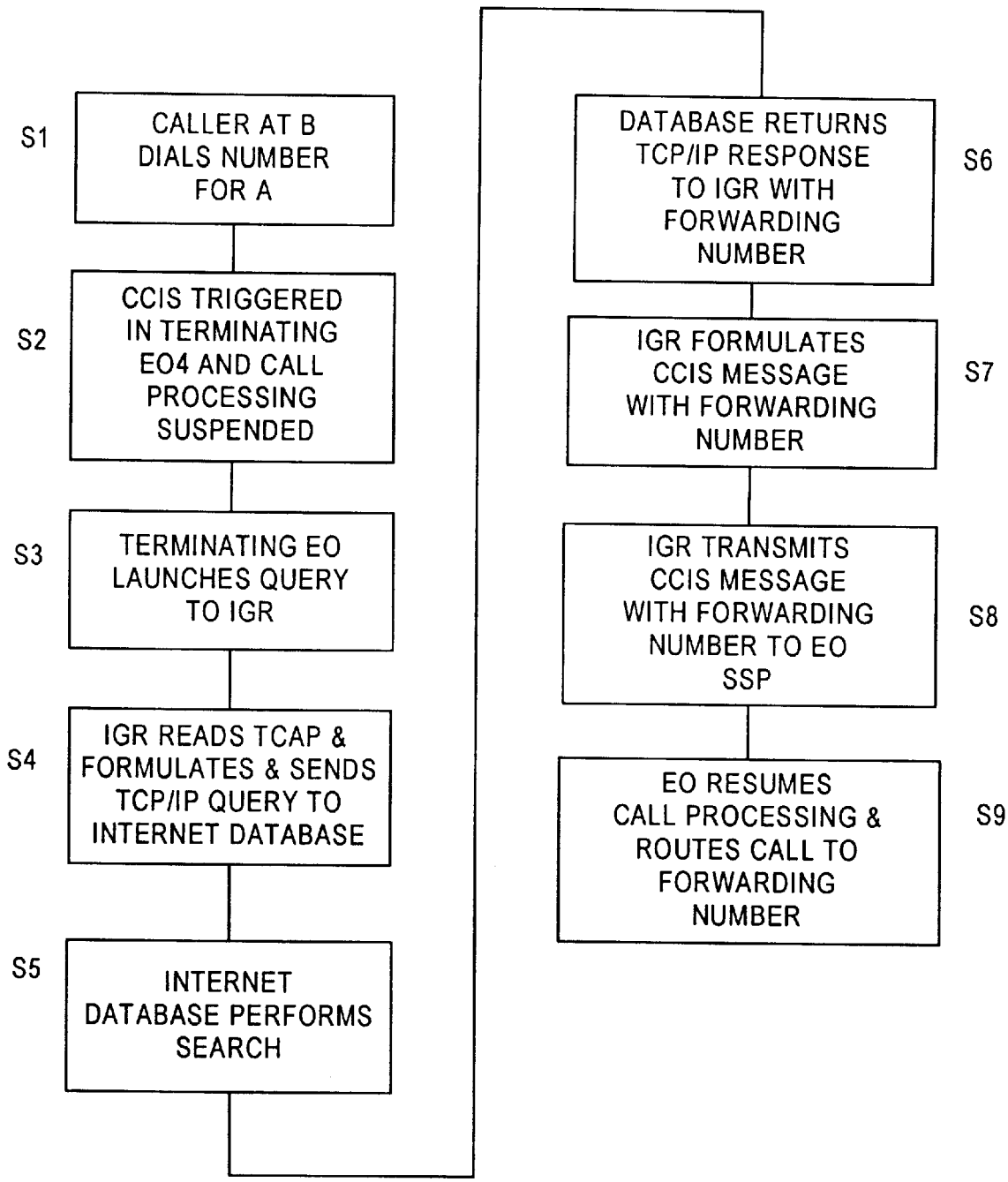
FIG. 8 is a simplified flow chart of another mode of the operation of the system illustrated in FIG. 6.

Referring to FIG. 8, at S1 a caller at telephone station G in FIG. 6 dials telephone station A at S1. In the terminating CLEC end office EO4, a trigger has been set against the NPA-NXX-XXXX code for the called subscriber at A, which is served by the destination EO4 of the CLEC. Detection of the dialing of this code upon receipt of the IAM CCIS signal indicates that the subscriber to the called number is a subscriber to custom calling services and therefore triggers intelligent common channel signaling processing by the end office EO4. The end office EO4 suspends call processing at S2 and launches a Transaction Capabilities Applications Protocol (TCAP) type query at S3. The TCAP type query goes through the signaling transfer point (STP) 19 to the Internet Gateway Router 31.

The Internet Gateway Router 31 translates the protocol of the received SS7 query and addresses a TCP/IP query to the database 35 at S4. According to the invention the Internet Routing Record for the custom calling of subscriber at A has been stored in the IRR database 35. The TCAP query to the IGR 31 includes the previously discussed variety of data fields containing information about the call. The significant field in this query is the called party number field (CPN). The Internet Gateway Router thereupon so formulates the TCP/IP message as to have the database 35 perform a search or look-up at S5.

The database performs the search, obtains the number to which the call should be forwarded, and returns a TCP/IP response to the Internet Gateway Router 31 at S6. The Gateway Router 31 obtains this TCP/IP response containing the number to which the call should be directed, namely the number for station B, and at S7 formulates a TCAP response message including this number based on the TCP/IP response. In this example, the Internet Gateway Router 31 formulates a TCAP type response message with the station B number placed in the CPN field of the response. The Internet Gateway Router 31 transmits the response message back through the STP 19 to the triggering end office EO4 in SS7 format. This is indicated at S8.

Upon receipt of the response message, the end office EO4 resumes its processing of the call, based on the information contained in the response message. In particular, the end office uses the CPN number from the response message to route the call in an otherwise normal manner. Since the dialed number was a forwarded number, the CPN in the response message indicates this number. The end office utilizes that number to route the call to the end office EO1 at S9.

It is an advantage of the invention that call forwarding and other custom calling services may be provided with respect to numbers assigned to stations which can be reached only through the Internet. Among other advantages, this feature provides operability over greatly expanded geographic areas which may be international. The use of the hierarchical DNS techniques for the DNS and for the database 31 in FIG. 3 permits virtually unlimited expansion possibilities.

According to a first embodiment of this feature of the invention there is shown in FIG. 6 a second Internet Gateway Router (IGR) 45 which is connected to the Internet. The Internet Gateway Router 45 is also connected to a station D through a processor such as a PC 47. Station D may be reached only through the Internet. The station D may be a plain old telephone station (POTS) or may constitute a computer microphone and speaker or headset arrangement, such as the type described in the parent application. In this embodiment the subscriber at D has only an Internet IP address and maintains his/her processor or PC in a continuously energized condition. The Internet Routing Record (IRR) database 35 is provided with a translation table or tables which not only provide translations from telephone number to telephone number but also provide translations from telephone numbers to Internet addresses. In this instance the translation table for the forwarded number for the station B provides an Internet address for the processor or PC 47. A simplified flow chart of the operation is presented in FIG. 9. Such operation proceeds in the following manner.

At S1 a caller at station G connected to end office EO3 dials the forwarded number DNA-NXX-XXXX of the subscriber at station B. The IAM from the calling end office EO3 to the end office EO1 for station B triggers the suspension of the call at S2. At S3 the triggered end office switching system and associated SSP transmit a query TCAP message to the Internet Gateway Router 31. This message includes the forwarded number that was dialed.

At S4 the Internet Gateway Router 31 formulates and transmits a TCP/IP query or command through the Internet to the database 35, seeking retrieval of the forwarded number of the subscriber. The database performs a data search, and dispatches a response to the inquiring Internet Gateway Router 31. This response forwards the Internet address corresponding to the forwarded number. This is shown at S5. If the address returned by the database is in the form of a domain name, the Internet Gateway Router 31 performs a translation to the Internet address at S6.

At S7 the originating Internet Gateway Router 31 formulates or assembles a TCP/IP packet (or packets) message and transmits the message through the Internet to the destination Internet Gateway Router 45. This message includes the address of the destination Internet Gateway Router 45, the originating Internet Gateway Router 31, and the Internet address of the subscriber at station D.

The destination Internet Gateway Router 45 receives the message at S8 and queries the processor or PC 47 to determine if the called party is available. If the party is not available, signaling messages to that effect are returned through the Internet and common channel signaling network to the calling end office SSP in inverse fashion at S9. The calling end office thereupon returns a busy or not available prompt to the caller at S10.

If the called party is available a TCP/IP linkage from originating Internet Gateway Router 31 to destination Internet Gateway Router 45 is established at S11. The Internet Gateway Routers at the originating and terminating ends perform the translation from voice to TCP/IP packets to voice signals and a voice path is established from the originating end office EO3 through the Internet Gateway Router (IGR) 31, the Internet 33, and Internet Gateway Router (IGR) 45 at S12. The conversation thereupon proceeds at S13.

Figure 9:
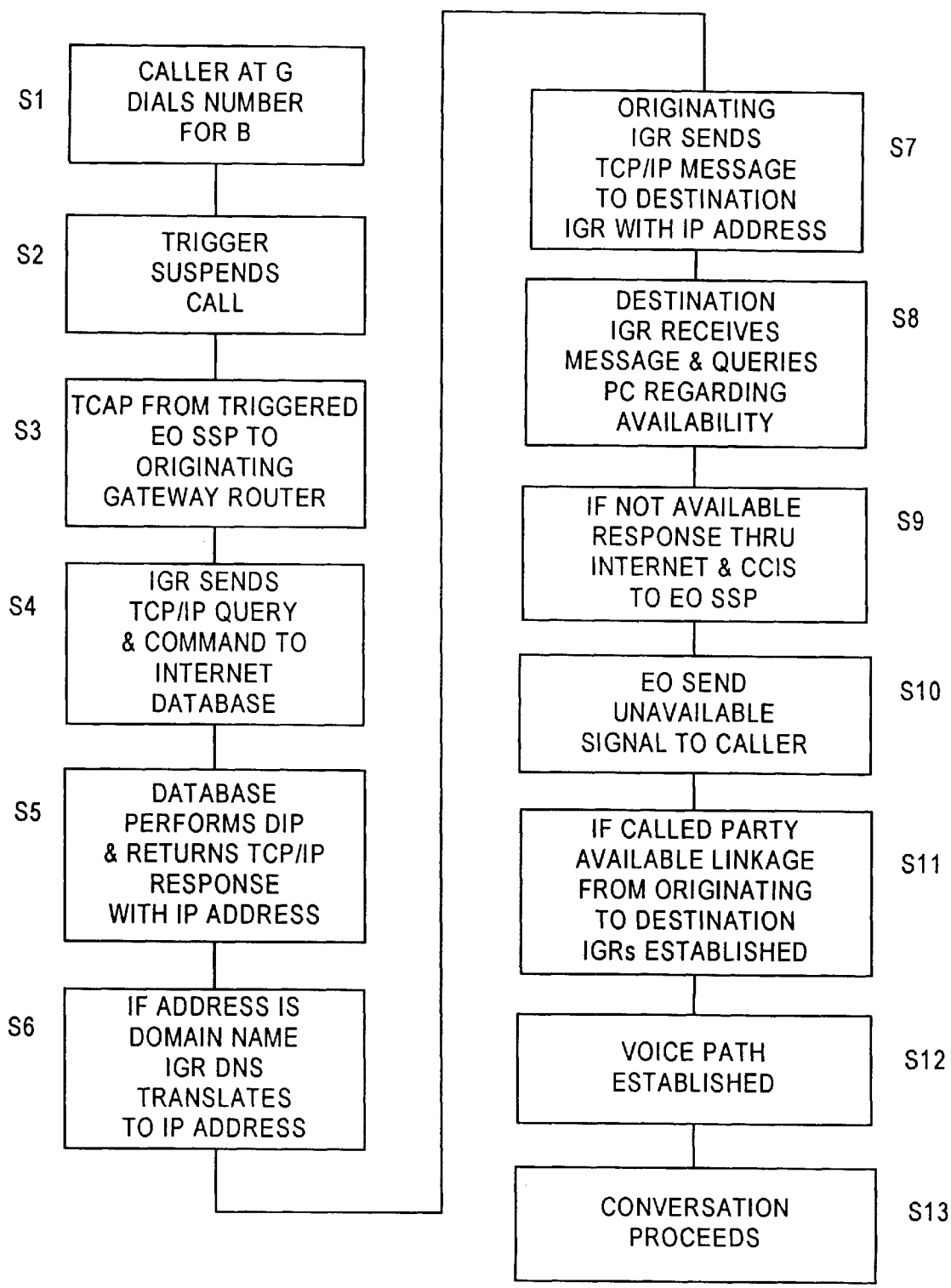
FIG. 9 is a simplified flow chart of yet another mode of the operation of the system illustrated in FIG. 6.

While the embodiment of the invention shown in FIGS. 8 and 9 utilized a processor or PC 47 at the premises of the subscriber, it is also a feature of the invention that the processing which occurs at that site may alternatively be performed at the site of the Internet Gateway Router and a voice message delivered to the telephone station D. Such an embodiment is illustrated in FIG. 8 by station E connected directly to Internet Gateway Router 45. The destination Internet Gateway Router 45 performs the processing previously performed in processor or PC 47.

It will be readily seen by one of ordinary skill in the art that the present invention fulfills all of the objects set forth above. After reading the foregoing specification, one of ordinary skill will be able to effect various changes, substitutions of equivalents and various other aspects of the invention as broadly disclosed herein. It is therefore intended that the protection granted hereon be limited only by the definition contained in the appended claims and equivalents thereof.

We claim:

1. A method for using a first telecommunications network including trunked together switching systems maintained and operated by a first telecommunications entity for selectively establishing a connection between a first station connected to a first one of said switching systems in said first telecommunications network and a second station associated with a second switching system in said first telecommunications network but connected to a third switching system maintained and operated by a second telecommunications entity, comprising the steps of:

a) storing in a database connected to a public wide area data network not maintained and operated by said first telecommunications entity, a table of information for call routing through said first telecommunications network, said table comprising entries relating to subscribers to at least said first telecommunications network;

b) setting in said second switching system a trigger for initiating call set-up signaling;

c) receiving from said first station call initiation characters identifying said second station;

d) responsive to receipt of said characters in said receiving step, transmitting a signal corresponding to said characters to said second switching system;

e) responsive to receipt of said second switching system, formulating a first data message;

f) transmitting said first data message from said second switching system to an interface between said first telecommunications network and said public wide area data network;

g) responsive to receipt of said first data message by said interface, formulating a second data message containing said identification characters as data;

h) transmitting said second data message to said database;

i) returning from said database to said interface a response message including routing information derived from said database for routing the call to said second station;

j) responsive to receipt of said response message by said interface, formulating a third data message including said routing information;

k) transmitting said third data message from said interface to said first telecommunications network; and l) responsive to receipt of said third data message routing said initiated call.

2. A method according to claim 1 wherein said public wide area data network comprises the Internet.

3. A method according to claim 1 wherein said first data message is in a first protocol and said second data message and said response message are in a second protocol.

4. A method according to claim 3 wherein said first protocol is a common channel interoffice signaling (CCIS) protocol and said second protocol is Transmission Control Protocol/Internet Program (TCP/IP) protocol.

5. A method according to claim 4 wherein said CCIS protocol is Signaling System 7 (SS7) protocol.

6. A method according to claim 1 wherein said call initiation characters correspond to the dialed number for said called station.

7. A method according to claim 1 wherein said trigger is a terminating trigger.

8. A method according to claim 1 wherein said first data message is transmitted to said interface through at least one signal transfer point (STP).

9. A method according to claim 1 wherein said third data message is transmitted from said interface through at least one signal transfer point (STP) to said switching system wherein said trigger is set.

10. A method according to claim 1 wherein said stations comprise telephone stations.

11. A method according to claim 1 wherein said database includes information for routing forwarded calls.

12. A method according to claim 1 wherein said interface includes a router.

13. A method according to claim 1, wherein said second station is connected to a switching system in a second telecommunications network.

14. A method for using a telecommunications network comprising a Local Exchange Carrier (LEC) having trunked together switching systems for selectively establishing a connection between a first telephone station connected to a first of said switching systems and a second telephone station connected to a second of said switching systems, comprising the steps of:

a) storing in a database, external to said telecommunications network and connected to the Internet, a table of information for call routing through said telecommunications network, said table comprising entries relating to subscribers to said telecommunications network;
   b) setting in at least one of said first and second switching systems a trigger for initiating call set-up signaling in said telecommunications network;
   c) receiving from said first telephone station a telephone number for said called station;
   d) responsive to receipt of said telephone number delivering a signal corresponding to said telephone number to the switching system wherein said trigger has been set in step b);
   e) responsive to delivery of said signal in step d), formulating a first data message in a Common Channel Interoffice Signaling (CCIS) format;
   f) transmitting said first data message to an interface connected between said telecommunications network and said Internet;
   g) responsive to receipt of said first data message by said interface, formulating a second data message in Transmission Control Protocol/Internet Program (TCP/IP) format containing said telephone number;
   h) transmitting said second data message to said database;
   i) returning from said database to said interface a response message in Transmission Control Protocol/Internet Program (TCP/IP) format including routing information derived from said database for routing a call to said second station;
   j) responsive to receipt of said response message by said interface, formulating a third data message in said Common Channel Interoffice Signaling (CCIS) format including said routing information;
   k) transmitting said third data message from said interface to said telecommunications network; and
   l) responsive to receipt of said third data messages, routing said call in accordance with said third data message.

15. A method according to claim 14 wherein said interface includes a router.

16. A method according to claim 15 wherein said response message includes a second telephone number for call forward routing in step 1).

17. A communications system comprising in combination:
   a) a first switched telecommunications network having trunked together switching systems connected by local links to subscriber stations and having a switching control data network using a first data protocol for effecting selective connection of said subscriber stations through said switching system;
   b) public a wide area data network, separate from said first switched telecommunications network, using a second data protocol to link multiple local area networks using therein data protocols different than said second data protocol, said public wide area data network being linked to said first telecommunications network through an interface between said networks, said interface being capable of performing protocol translation;
   c) a wide area data network routing database connected to said public wide area data network and having stored therein routing information for effecting selective connection of said subscriber stations through said switching systems in said first switched telecommunications network pursuant to preselected options of said subscriber stations stored in said database;
   d) said first switched telecommunications network having control parameters set therein whereby the initiation of a connection between a caller at one of said subscriber stations to a called station having a preselected option for routing stored in said database results in data signaling through said interface to and from said database resulting in (i) retrieval of routing instructions from said stored preselected option, and (ii) effecting of said initiated connection pursuant to said routing instructions.

18. A communications system according to claim 17 wherein said second data protocol is Transmission Control Protocol/Internet Program (TCP/IP).

19. A communications system according to claim 18 wherein said first data protocol is in Common Channel Interoffice Signaling (CCIS) protocol.

20. A communications system according to claim 18 wherein said wide area data network is the Internet.

21. A communications system according to claim 17 wherein said parameters are set in selected switching systems in said first switched telecommunications network.

22. A communications system according to claim 21 wherein said parameters comprise triggers actuatable by receipt of station address signals responsive to said initiation of a connection.

23. A communications system comprising in combination:
   a) switched telecommunications networks having trunked together switching systems connected by local links to subscriber stations and having a switching control data network for effecting selective connection of said subscriber stations through said switching systems;
   b) said switching control data network including a public wide area data network separate from said switched telecommunications networks using a first data protocol to link multiple local area networks using in said local area networks data protocols different than said first data protocol,
   c) a wide area data network routing database connected to said public wide area data network and having stored therein routing information for effecting selective connection of said subscriber stations through said switching systems in said switched telecommunications networks pursuant to preselected options of said subscriber stations stored in said database;
   d) said switched telecommunications networks having control parameters set therein whereby the initiation of a connection between a caller at one of said subscriber stations to a called station having a preselected option for routing stored in said database results in data signaling between at least one of said switching systems and said database resulting in retrieval of routing instructions from said stored preselected option and effecting of said initiated connection pursuant to said routing instructions.

24. A communications system according to claim 23 wherein said first data protocol is Transmission Control Protocol/Internet Program (TCP/IP).

25. A communications system according to claim 24 wherein said wide area data network is the Internet.

26. A communications system according to claim 23 wherein said parameters are set in selected switching systems in said first switched telecommunications networks.

27. A communications system according to claim 26 wherein said parameters comprise triggers actuatable by receipt of station address signals responsive to said initiation of a connection.

28. A communications system according to claim 23 including subscriber stations connected directly to said wide area data network.

29. For use with a telecommunications network maintained and operated by a first telecommunications entity, a method for establishing a connection between a first station connected to said telecommunications network and a second station, said method comprising the steps of:

a) storing in a database, external to said telecommunications network and connected to a first public wide area data network not maintained and operated by said first telecommunications entity, a table of information for call routing through said telecommunications network, said table comprising entries relating to subscribers to at least said first telecommunications network;

b) setting in a switching system associated with at least one of said first station and said second station a trigger for initiating call set-up signaling;

c) receiving from said first station a call initiating input address for said called station;

d) responsive to receipt of said address, delivering a signal corresponding to said address to the triggered switching system recited in step b);

e) responsive to said delivery of said signal in step d), formulating a data message and delivering said data message to said database;

f) returning from said database a response message including routing information derived from said database for routing a call for said second station; and g) responsive to receipt of said response message, routing said initiated call.

30. A method according to claim 29 including the step of routing said initiated call to a station connected directly to the wide area data network.

31. A method according to claim 30 including the step of transporting a voice communication between the station at which said call originated and said station connected directly to the wide area data network.

32. A method according to claim 31 wherein said wide area data network is the Internet.

33. In a telecommunications network including a first public switched telephone network portion, maintained and operated by a first telecommunications entity and having trunked together switching systems each serving respective telephone stations, and a second public switched telephone network portion, maintained and operated by a second telecommunications entity and having at least one switching system serving respective telephone stations, a method for selectively establishing a connection between a first station connected to one of said switching systems in said first network portion and a second station, connected to a switching system in one of said network portions and having a telephone number associated with a switching system in said first network portion to which said second station is not connected, said method comprising:

storing in a database connected to a public wide area data network, not maintained and operated by said first telecommunications entity, a table of information for call routing through said telecommunications network;

setting in at least one of said switching systems in said first network a call processing trigger;

in a call placed by said first station, receiving a signal at the switching system in which said trigger is set, said signal representing the second station telephone number input by the calling station;

in response to receipt of said signal, accessing from said database through said wide area public data network routing information derived from said database for routing the call to said second station; and completing routing of the call to the second station in accordance with the information derived from the database.

34. A method as recited in claim 33, wherein said switching system connected to said second station is in said second network portion.

35. A method as recited in claim 34, wherein said switching system in which said trigger is set is the switching system with which the telephone number of the second station is associated.

36. A method as recited in claim 34, wherein said switching system in which said trigger is set is the switching system to which the first station is connected.

* * * * *